United States Patent
Koehler et al.

(10) Patent No.: US 6,999,906 B2
(45) Date of Patent: Feb. 14, 2006

(54) RECONFIGURATION METHOD FOR A SENSOR SYSTEM COMPRISING AT LEAST ONE SET OF OBSERVERS FOR FAILURE COMPENSATION AND GUARANTEEING MEASURED VALUE QUALITY

(75) Inventors: Thomas Koehler, Munich (DE); Winfried Lohmiller, Munich (DE)

(73) Assignee: EADS Deutschland GmbH, Ottobrunn (DE)

(*) Notice: Subject to any disclaimer, the term of this patent is extended or adjusted under 35 U.S.C. 154(b) by 210 days.

(21) Appl. No.: 10/484,046

(22) PCT Filed: Jul. 18, 2002

(86) PCT No.: PCT/DE02/02638

§ 371 (c)(1),
(2), (4) Date: Jan. 16, 2004

(87) PCT Pub. No.: WO03/017011

PCT Pub. Date: Feb. 27, 2003

(65) Prior Publication Data

US 2004/0216000 A1    Oct. 28, 2004

(30) Foreign Application Priority Data

Jul. 20, 2001   (DE) .............................. 101 35 586

(51) Int. Cl.
*G06F 15/00* (2006.01)
*G06F 11/00* (2006.01)
(52) U.S. Cl. .................... 702/193; 62/126; 236/35; 701/29; 702/185; 714/4

(58) Field of Classification Search ............... 702/65, 702/79, 128, 185, 186, 190, 193–195; 62/126; 236/35; 714/4; 701/29
See application file for complete search history.

(56) References Cited

U.S. PATENT DOCUMENTS 4,804,139 A    2/1989   Bier

FOREIGN PATENT DOCUMENTS

DE    3638131    5/1988

(Continued)

OTHER PUBLICATIONS

Bryson, A., Ho. Y. "Applied Optimal Control", 1975, Taylor & Francis, pp. 388 and 389.

(Continued)

*Primary Examiner*—Bryan Bui
*Assistant Examiner*—John Le
(74) *Attorney, Agent, or Firm*—W. F. Fasse; W. G. Fasse

(57) ABSTRACT

The invention relates to a reconfiguration method designed to be implemented in a computer system, for compensating failures of a sensor system (1). The sensor system includes at least one sensor (2, 50) for measuring (12, 22) system states of an application system (11, 21) and at least one system model (4) for describing the application system, which together form at least one first observer (6) for estimating system states in order to provide system states for an allocated data processing device (14, 24). According to the method, failure states for a first observer are determined from deviations, which occur as a result of the comparison between a number of states measured by the sensor or sensors and a state estimated by the system model.

17 Claims, 2 Drawing Sheets

U.S. PATENT DOCUMENTS

Figure 1:
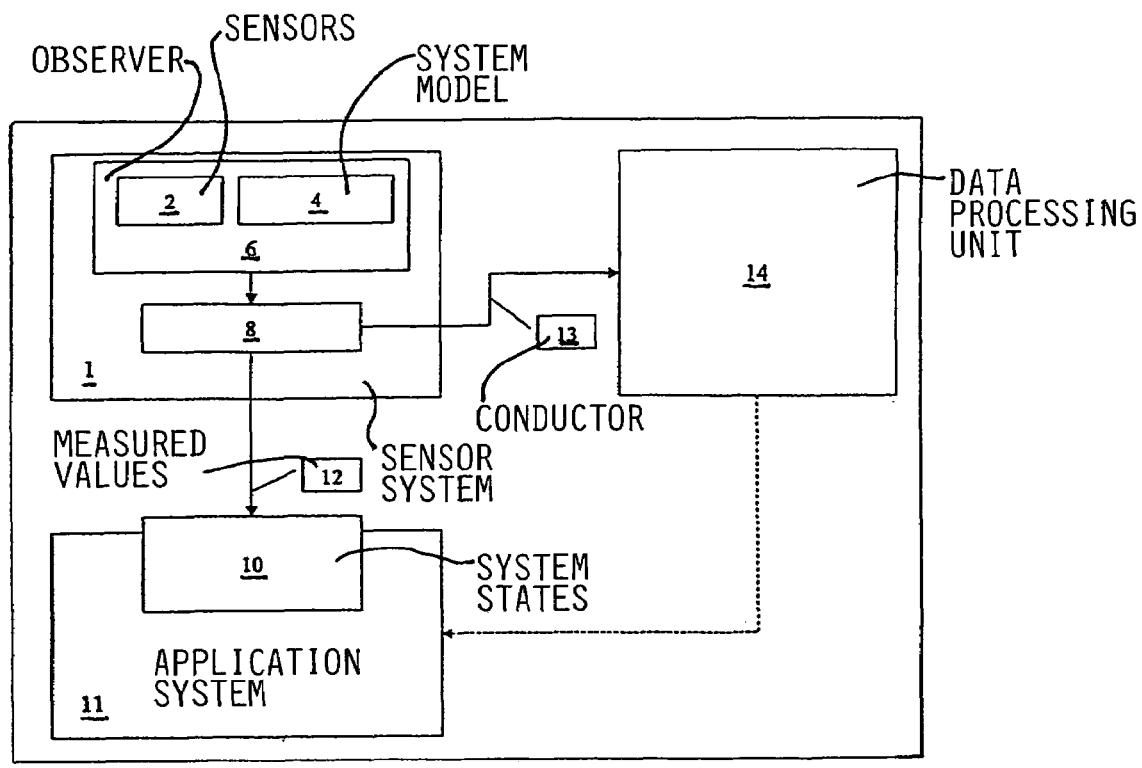

| | | | |
|---|---|---|---|
| 5,582,021 A | 12/1996 | Masauji | |
| 6,594,620 B1 * | 7/2003 | Qin et al. | 702/185 |
| 2002/0193920 A1 * | 12/2002 | Miller et al. | 701/29 |

FOREIGN PATENT DOCUMENTS

| | | |
|---|---|---|
| DE | 19545719 | 6/1997 |
| DE | 19705766 | 8/1998 |
| EP | 1096122 | 5/2001 |
| WO | WO 94/12948 | 6/1994 |
| WO | WO 01/35176 | 5/2001 |

OTHER PUBLICATIONS

"Pocketbook of Mathematics", Bronstein, 25$^{th}$ Edition, 1991, pp. 680, 681, 684 to 686.

"Regelungstechnik" (Closed Loop Control Technology) by O. Foellinger, 1994, Huethig GmbH, pp. 405 to 407.

* cited by examiner

RECONFIGURATION METHOD FOR A SENSOR SYSTEM COMPRISING AT LEAST ONE SET OF OBSERVERS FOR FAILURE COMPENSATION AND GUARANTEEING MEASURED VALUE QUALITY

The invention relates to a reconfiguration system provided for implementation in a computer system for the compensation of failures of a sensor system with at least one set of observers for the failure compensation and assuring a measured value quality.

The invention relates particularly to a reconfiguration system provided for implementation in a computer system and to a respective sensor system for the compensation of failures of the sensor system with at least two configurable observers, each of which comprises at least one respective sensor for measuring of system states of an application system and at least one system model for describing the application system while forming at least one first observer for estimating of system states in order to make system states available to an allocated data processing unit, whereby failure states based on deviation values are ascertained for a first observer, said deviation values resulting from a comparing of a number of states measured by means of the at least one senor with a state estimated by means of the system model.

German Patent Publication DE 36 38 131 A1 discloses a control unit in which temperature threshold values are stored for two heat sensors. In case of a failure of one sensor that is in case of a non-tolerable deviation from a rated value, a replacement value is used. The replacement value is constant and identical for each operational state. The replacement value represents a difference value of the temperatures relative to a normal state. The respective temperature value is ascertained by means of a certain addition or subtraction.

German Patent Publication DE 197 05 766 C1 discloses a control device for an internal combustion engine. The control device comprises different sensors such as a pedal position sensor, an air mass meter or a temperature sensor. Furthermore, operational quantities such as an atmospheric pressure or an exhaust counter-pressure are ascertained through a performance graph relationship or by an observer. Actuators are activated with the control values ascertained by the control device, each activator including an activator drive and an activating member. Activating members are provided in the form of a throttle flap, an injection valve, a sparkplug or a change-over switch between two different suction pipe lengths. A monitoring unit monitors at least one sensor. Different sensor values or estimated values thereof are ascertained by means of the sensors and the observer. Derivative values are ascertained from the sensor or estimated values. When respective predetermined threshold values are exceeded, a conclusion is made in accordance with a given scheme regarding the faultiness of certain sensors.

World Patent Publication WO 94/12948 A1 discloses a method and an apparatus for operating a neural network with missing and/or incomplete data. A decision processor is provided for monitoring an output control, whereby the output is either varied or prevented if the output of an uncertainty model exceeds a predetermined threshold value. A probability value for the reliability of the output is used as an input for the decision processor. The probability value is ascertained during the training phase for a predetermined value range.

Sensor systems or measuring systems that are technically realizable always have a deviation from an ideal system state. As long as these deviations do not impair the required, specified accuracy of the output information, one talks of errors or also of non-calibratable remainder errors. The meaning of the word "error" in this context does not connotate the implication that a status warranting correction is involved. Rather, an accepted "deviation" is involved. If these deviations impair the required specified accuracy of the output information due to hardware defects that have occurred, software defects, or due to shortcomings in the system modeling, then one speaks of "failures".

A system is referred to as "failure tolerant" if it timely recognizes failures of internal components or internal failures which can lead to failures of the output information and if it prevents by suitable measures or reconfiguration that the output information impairs the required or specified accuracy.

Prior art observers are known for estimating the states which occur in processes or in the operation of technical systems. Such observers are, for example described in "Regelungstechnik" (Closed Loop Control Techniques) by O. Foellinger, 1994, Huethig GmbH on pages 405 to 407. These observers constitute a combination of sensors for a partial or complete measuring of instantaneous states and of a system model which describes as a function of time the characteristics of a predefined system for analytically ascertaining the status. An observer formed of sensors and the system model and constitutes a complete description of the system up to the present, estimates hereby the system status. Such an observer may generally be a Luenberger-observer, a Kalman-filter, a neural network, or another conventional observer method.

It is further known in the prior art to use an observer for fusing of sensor signals with a system model. Thereby, the observer takes into account the assumed accuracy of the system model and the assumed accuracy of the sensor signals in such a way that it fuses these in a most optimal manner.

Since the system status is partially measured with at least one sensor it is possible to ascertain a failure status due to the deviation of the measured values from the expectation of the respective estimated values of the system model. Following a comparing with threshold values, a failure status is present.

An optimal fusion of all sensor signals can be effected with the aid of a Kalman-filter while using a predetermined weighting. Weighting is accomplished in that in the system operation relatively imprecise sensor signals or system states of the system model are weighted lower than more precise sensor signals or system states of the system model. Thereby, certain accuracies of the sensors or of the system model are assumed. The mentioned fusion can, however, only then be optimal if the assumed accuracies of the sensor signals or of the system model correspond to the actual accuracies of the sensor signals or of the system models. In case of a failure of a sensor signal or of a system model, that is when the predetermined accuracy of one or more sensors or of the system models cannot be maintained, the observer keeps using the sensor signals or the system states of the system model now as before in the original predetermined weighting. Thus, even if a sensor delivers imprecise signals, it will be weighted relatively strongly due to the predesignation as a precise sensor or system status designated sensor in combination with the other sensors or system states. In this case the observer no longer weighs the different signals in the optimum manner so that overall the observer provides a solution that is less than optimal. This can lead to a substantial loss of accuracy in the output signals of the observer.

The described disadvantage applies to each observer method according to the prior art and particularly for those using Kalman-filters.

A so-called observer or Kalman-filter bank has been developed on the basis of the observer technique in order to recognize sensor failures or system modeling failures and to remove these from the system. In such a bank a plurality of observers are used simultaneously and in parallel. Such a system is published in the Publication Bryson, A., Yu Chi, H., "Applied Optimal Control", 1975 on the pages 388 and 389. Thereby an observer referred to as main observer processes all signal to be processed with a system model that has reference to a system without any system defects. In contrast thereto, the other observers, so-called sub-observers, process a sub-selection of the sensor signals to be processed in combination with system models which have reference to different system defects. Which sub-observers are to be used in an observer bank depends on which combination of sensor defects and system defects are to be considered.

Each observer of the observer bank ascertains for each sensor measurement a so-called residue which constitutes the difference between the measured sensor signal and the expected sensor signal that the observer expects for this point of time through the system model. This comparing of the residue with an expected value or accuracy of the residue permits the determination of the probability density that the last measurement corresponds to the system model of the observer. If this probability density falls below a threshold value, this fact is treated as a failure. In order to recognize deviations that build up over time as a failure, as soon as they constitute a failure, the known observer bank takes into account, when it judges the probability density of the residues, also all residues that occurred in the past. The probability density of all past measurements are determined with the aid of mathematical methods. In case of a detected failure, that is when the probability density of past measurements in connection with the system model fall below a probability threshold value, the observer bank switches over to that sub-observer having at this time the highest probability density.

It is a disadvantage of the known method that it functions reliably only when failures occur that have been previously defined.

It is an object of the invention to provide a sensor system with at least one set of observers and a method for a reconfiguration of the sensor system by means of which an improved precision is achieved in case of a failure.

This object has been achieved by the features of claim 1. Further embodiments are defined in the dependent claims.

The reconfiguration method according to the invention is provided for implementation in a computer system for compensating of failures of a sensor system. The present system comprises at least one sensor for measuring of system states of an application system and at least one system model for describing the application system while forming at least one observer for estimating the system states in order to make these system states available to an allocated data processing unit. With this method failure states are ascertained for an observer, i.e. in a first combination of one sensor and one system model. These failure states result from the comparing of a number of states measured by the at least one sensor with a state that has been estimated by the system model. When a first threshold value of deviations is reached, at least one further observer is initiated. The further observer is a further combination of a sensor and a system model. The further observer is initiated by the system state measured by the first combination and a number of deviations. Thereby, the system states ascertained by the further combination are transmitted to the data processing unit for further processing. This transmittal takes place as soon as the first combination reaches a second threshold value.

In connection with the reconfiguration method, the first combination can be initiated by the further combination and system states are transmitted to the data processing unit for further processing, as soon as the first combination falls below the first threshold value.

When the first observer exceeds the first threshold value, that further observer can be selected which has the smallest deviations of the system states over a predetermined past time interval. Alternatively, the second observer can be selected in accordance with a predetermined sequence when the first observer exceeds the first threshold value.

It is an advantage of the method according to the invention or of the apparatus according to the invention that the observer bank, by switching over to another observer configuration with a sub-quantity of sensor signals does not reject the sensor signals that occurred prior to the failure of the main observer that has now been recognized as being defective, since its signals prior to the failure have been sufficiently accurate. Thus, for example, all learning effects are not lost, such as the estimating of sensor offsets or an increased accuracy of the observer, which have been produced prior to the failure by the switched off sensor signal.

Contrary to the prior art no switch-over takes place to a sub-observer in case of a failure, which sub-observer currently includes a correct system modeling with a system deviation, but did not correctly describe the system in the past because then the system deviation had not yet occurred.

By taking into account past values an unnecessary reduction in the observer accuracy is avoided.

The solution according to the invention is also advantageous relative to the accuracy that occurs after an internal failure. According to the invention the observer bank switches back to the respective observer if the deviation of the sensor or system model recognized as failed was so large prior to the recognition of the failure, that it would still influence probability density calculations performed after the failure, that is, future probability density calculations. Thus, contrary to the prior art, the information of future possibly correct sensor signals of the sensor that has been classified as failed are not rejected. When a system deviation occurs the invention switches to the correct system model without system deviations which also leads to an improvement of the accuracy of the output signals.

Compared to the solution according to the invention, the method according to the prior art can lead to a substantial loss of information of the observer bank, taking into account effects that are relevant for the past and including effects that are relevant for the future. This is so because a large proportion of correct sensor signals are rejected by the prior art or it does not work with the system models that have been recognized as being correct.

Figure 2:
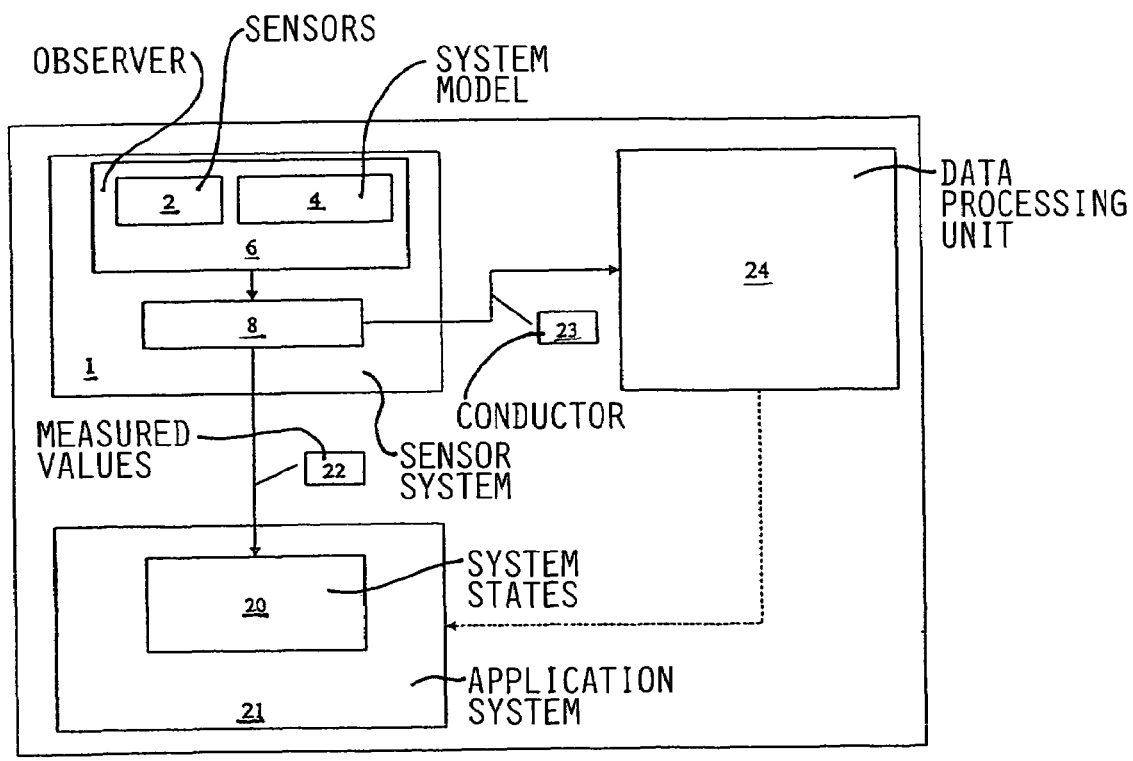
Figure 3:
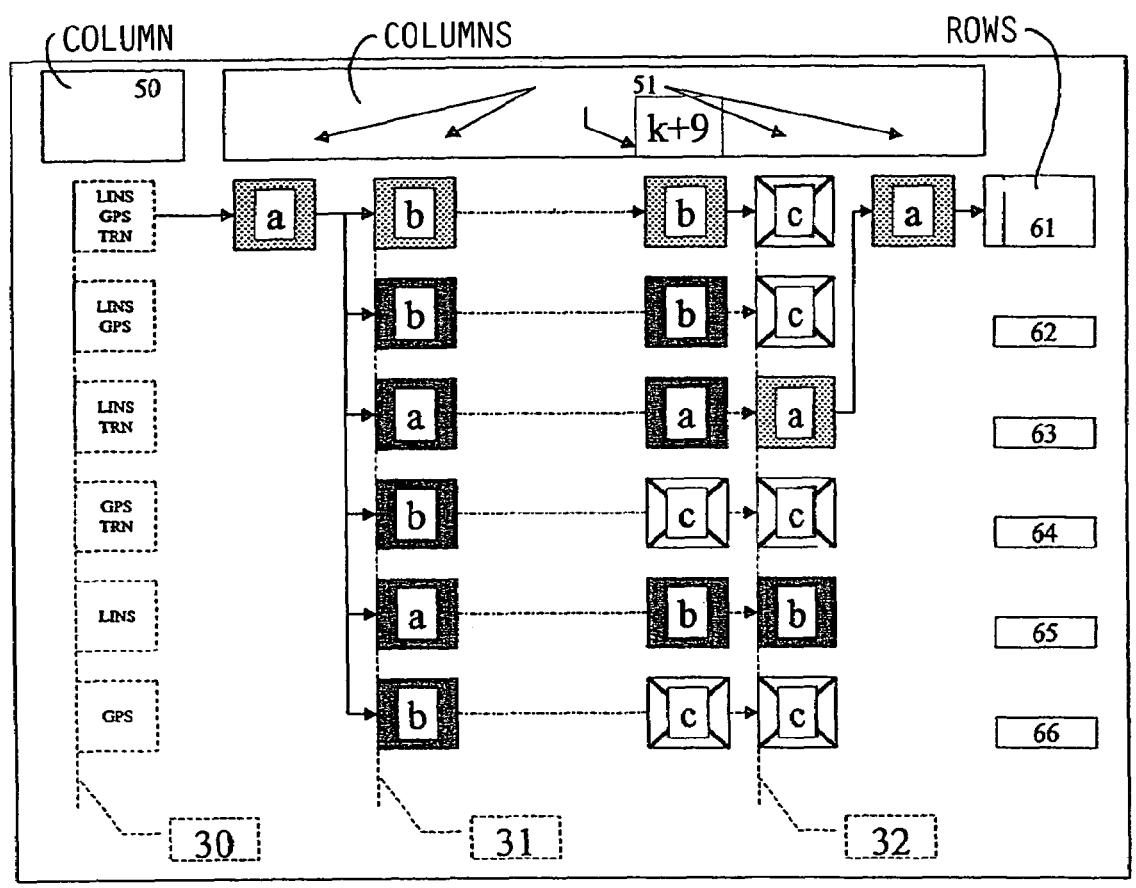

In the following the invention will be described with reference to the accompanying figures which show:

FIG. 1 a first example for the application of the sensor system according to the invention or the method according to the invention, wherein the outer states or motion states of an application system are acquired by the sensor system;

FIG. 2 a second example for the use of the sensor system according to the invention or the method according to the invention, wherein inner states or operational states of another application system are acquired by the sensor system; and FIG. 3 shows an observer bank provided in a sensor system, thereby showing, for example an occurred internal failure and its system technical treatment in timed steps k to k+11.

According to the invention there is provided a reconfiguration method for a sensor system 1. The sensor system 1 comprises several sensors 2 for measuring of states of an application system and at least one system model 4 for describing the application system 11, thereby forming at least one set of observers 6, in order to make available states 10 of the application system 11 by means of measured values for a data processing unit 14 allocated to the sensor system. Whereby failures in the sensor system, deviations in the system modeling, or failures in the application system are compensated by the reconfiguration and measured values having an optimal quality are made available. The respectively used at least one system model 4 can be an analytical model, that is, a model formulated by algorithms and/or it can be a model described by lists and allocations. The sensor system 1 further comprises a calculating unit 8. Interfaces to application systems and to allocated data processing units 14 as well as system functions are implemented in the calculator unit 8, for example for a timely presentation of values of different functions of the sensor system 1. The reconfiguration method according to the invention can be implemented in the calculator unit 8 or at another position in the sensor system 1 or in a unit outside of the sensor system 1.

Thus, the claimed method or system relates generally to a sensor system which determines states of an application system. Thereby, the sensor system may be provided for the general case of measuring states which are indirectly caused by a system or an application system and in a second general case to measure states of the system or of the application system directly, that is to measure its operational states.

In a first case in which outer states 10 are measured by means of the sensor system 1 according to the invention and which is shown in FIG. 1, the application system 11 may, for example be a vehicle such as a land vehicle, a sea-going vehicle, or an airborne vehicle, particularly an aircraft or a robot. In connection with a vehicle the outer state may include the position or an attitude in space or a time derivation thereof. The measured values that have been measured by the sensor system 1 for the outer states are fused in the sensor system 1 in accordance with the method of the invention. The measurement is symbolically designated by the reference character 12. The measured values are fused by means of the at least one set of observers 6 including sensors 2 and at least one system model 4 to form an optimized status vector which is supplied for further use through a conductor 13 to a data processing unit 14 allocated to the sensor system 1. The data processing unit 14 may be a control system, an open loop control system, a closed loop control system, or a guidance system. The data processing unit 14 may particularly also be provided for the open loop control of the application system.

The sensor system 1 may be a navigation system and/or an attitude reference system. For example, in this application case the sensors are inertia sensors and the system model is a model that describes the response characteristic of the vehicle on the basis of open loop control forces. In this case the system model is thus an analytical vehicle model. Further, the sensor system may be an air data system which includes the motion states, the velocity, the altitude, and the reference angle to the surrounding air. For example, the sensor system according to the invention may also be provided for the acquisition, for example of the position of a robot in space or the position and/or orientation of a robot arm.

The internal failures that are to be compensated by the method according to the invention and that may occur thereby may relate to the system model, particularly due to an inaccurate reproduction of the real vehicle characteristic or a systematic model error, or to the sensors, for example due to failure or defect of one or several sensors.

In the second case illustrated in FIG. 2, the application according to the invention relates to a mechanical, chemical or electrotechnical application system 21. In the second case internal states or operational states 20 are to be measured by the sensor system 1. The internal state of the application system 21 may be formed by a dynamic process which in turn may be characterized mechanically, chemically, or electrotechnically. The measured values that have been measured by the sensor system are indicted symbolically by the reference character 22. These measured values are fused in accordance with the method according to the invention to form an optimized status vector in the sensor system by means of at least one set of observers 6 constituted by sensors 2 and at least one model 4. The optimized status vector is supplied through a conductor 23 to a data processing unit 24 allocated to the sensor system 1 for further use. The data processing unit 24 may be a control system or an open loop control system.

An example for a mechanical system as a case of using the application system 11, is an adjusting system. The operational states of the adjusting system may be the position and/or the speed of a servo-valve, of an actuator or of pressures. The operational states to be measured in a chemical application system may be reaction temperatures, concentrations of materials reacting with each other, pressures, or generally intrinsic or extrinsic parameters or characteristics of any kind. In an electrical system the operational states to be measured may be currents, voltages, capacities, or also material or chemical characteristics.

The internal failures occurring in the second application case shown in FIG. 2 and which are to be compensated by the method according to the invention may relate to:

the system model, particularly due to inaccuracies in the reproduction of the real vehicle characteristic or due to systematic model deviations, whereby the system model may be available analytically or as a set of data based on an aerodynamic, chemical, or other type of calibration, the sensors, for example, due to failure or defect of one or several sensors, or deviations of values of the process or of the apparatus from rated values due to technical failures, for example due to a mechanical failure or due to a failed process control or electrical failures.

The arrangements comprising a sensor system and an application system shown in FIGS. 1 and 2 and their functional coordination may also be combined with each other. Thereby, particularly the sensor system may be provided with sensor models, which acquire external states as well as operational states. In such applications, however, sensor systems may also be coordinated so that one sensor system acquires external states and another sensor system acquires operational states.

Summarizing, the reconfigurable sensor system according to the invention is provided for the measurement of states, whereby an arrangement or data processing unit and a control or open loop control arrangement is allocated to the sensor system. The acquired measured values are to be supplied to the data processing unit for further processing. For this purpose the measured values must have the required integrity and they must be available. Therefore, sensor failures and system model deviations must be compensated. In the respective applications of the second case, an operational state must be controlled or controlled in open-loop fashion or in closed-loop fashion. Thereby, determination values of the respective operational states must be additionally acquired with the best quality, availability, and integrity.

All mentioned failures of all mentioned applications can be compensated according to the invention and the measured values can be made available with an optimal quality. This is so because the decision whether a reconfiguration shall take place depends, according to the invention, only on the deviations between sensor values and values of the respectively used system model that is, only the so-called residues are considered. It is of no consequence whether the failures relate to the sensors, to the system model, or, if applicable, to a further system to be monitored.

The sensor system 1 according to the invention is a failure tolerant system to the extent that it can compensate for the mentioned types of failures that occur in the sensor system 1. However, the system can also be used as a failure recognition system or as a failure monitoring system because the system can recognize failures of an external system which is the application system 11 or 21, which failures may have reference to outer states of an application system 10, for example motion states in space or they may have reference to operational states of the application system 20. The recognition is based on the comparing of the fusioned values with rated values. In the sensor system 1 a combination of sensors and a system model cooperate in an observer. The sensors thereby have, particularly in the actual measuring unit, hardware components. A system model can only be realized by software. This arrangement estimates a system state and is in the position, when sensors fail, to supply to other functions a best possible estimation of the system state, said estimation having been ascertained by software.

Thus, types of failures can be taken into account, such as sensor hardware defects as well as software or system deviations. Thereby, attention must be paid that a deviation can grow until it becomes a failure because the method according to the invention performs in timed steps. A deviation that occurred in a first timed step, continues in the following timed step. The states or state values to be measured are time dependent so that the sensors acquire time dependent states.

The reconfiguration method according to the invention will be described in the following with reference to FIG. 3 which shows schematically and with reference to an example of a navigation system provided for aircraft, sensors and the switch-over or reconfiguration method according to the invention for a sensor failure assumed as an example.

The mechanism or the reconfiguration method can be adapted to different system models in that different sensor combinations 10 are replaced in FIG. 3 by different system models. A combination of sensor combinations and different system models is also possible.

FIG. 3 illustrates, row by row, the deviation states of several sensors and sensor combinations of the sensor system 1. These deviations are listed in column 50, for example for a navigation system. The deviation states are designated with the abbreviated name of the respectively provided sensors. The abbreviated names used in FIG. 3 are: LINS for laser inertial navigation system, GPS for global positioning system, and TRN for terrain reference navigation system. The signals coming from these sensors or sensor combinations stand ready for the at least one set of observers 6. Thereby, the observers 6 are referred to as main observers if their values are used in the data processing unit 14 or 24 or as sub-observers if their values are not used in the data processing unit 14 or 24. Thereby, in the illustrated embodiment and for the illustrated output status the main observer (line 61) receives the sensor signals of a LINS (Laser Inertial Navigation System), of a GPS (Global Positioning System) and of a TRN (Terrain Reference Navigation).

The example shown in FIG. 3 of a sensor related portion of a navigation system shows the sensor system states and the corresponding failure status or failure state 51 of a main observer and of several sub-observers, respectively, in a plurality of timed steps k to k+11 following one another. In the shown example observers are used for the fusion of the sensors with the system model. In this case the term "system state" means the complete current description of the respective system, i.e. the values of all important magnitudes ascertained through the observer in an actual time step. In order to show the timed sequence on the one hand and the simultaneous occurrence of these characteristics on the other hand, these characteristics are arranged in lines 61, 62, 63, 64, 65 and 66 and in columns k to k+11. The columns k to k+11 symbolize the illustrated timed steps while filters activated in the respective timed steps are shown in the lines 61, 62, 63, 63, 64, 65 and 66. Thereby, the main observer or the first observer is shown in line 61, while the sub-observers or further observers available for use are illustrated in lines 62, 63, 64, 65 and 66. Thereby, the observers which make the values available for allocated data processing units 14 or 24 are illustrated with dot-filled blocks. These observers are respectively active at a timed step. The observer whose values are not used during a timed step which, briefly stated, are inactive, are illustrated by gray-filled blocks.

Several observers that are active during a timed step are designated as an observer bank. The observers or rather main observers or sub-observers and the allocated system models themselves are not shown in FIG. 3. Rather, only the sensors or sensor combinations listed in column 50 which are connected to system models and which belong to certain observers are shown. These allocations are dependent on the individual case and application and are to be determined in accordance with known criteria such as accuracy, available technologies and so forth, and according to layout methods. Thus, the system states transmitted to the respective data processing unit are respectively ascertained by a combination of at least one sensor for measuring of system states of an application system and by at least one system model for describing the application system while forming at least one set of observers for estimating system states. Such combinations will be referred to in the following briefly as combination.

The main observer or first observer and the sub-observer or further observers use as actual sensor signals the signals from different sensors 50. Thereby, the main observer is formed of a predetermined combination including at least one sensor and at least one system model not shown in FIG. 3. Thereby, the main observer or first observer uses the signals, preferably of a maximum number or of a first selection of observers, in order to have an accuracy and measuring quality as high as possible, while the sub-observers or further observers use the signals of a sub-combination of this maximum number or of the first selection of sensors. The system models used thereby may be different system models.

The sensors of the embodiment shown in FIG. 3 as an example are provided for a navigation system. Other sensors and thus main observers and sub-observers come into consideration for other navigation systems as well as sensor systems which are provided for other applications, FIGS. 1 and 2. The mechanism can also be adapted for different system models in that the various sensor combinations 10 are replaced by different system models. Further, a combination of sensor combinations and different system models is also possible.

FIG. 3 shows the timed sequence, as an example, in twelve steps in which a failure in the sensor signals has been recognized. The illustration of FIG. 3 shows how the sensor system behaves during the time in which the internal failure is present and how the system thereafter is reconfigured. Thereby, the shown timed steps k to k+11 represent only one section of an entire timed function procession. In FIG. 3 the first timed step is designated by the cipher k and the second timed step is designated by the cipher k+1. Further timed steps are not shown in this figure and are passed over up to the eleventh timed step designated as k+10. Concluding the timed step k+11 is shown in which the sensor system has reached again the starting status in the shown example.

The blocks 51 symbolize the sensor system states and the failure states of the observers or filters in each timed step and the failure status is described by one respective probability magnitude. This magnitude makes a statement with which probability the system model of the block has produced correct measurements. The probability is ascertained on the basis of a predetermined number n of latest measurements. The probability magnitude can be produced advantageously from the significance. The significance a of the latest n-measurements can be determined with the aid of the $x^2(\alpha, n)$-function, specifically or particularly in accordance with a Gauss-method, or a rectangle method, or a Voter-Monitor-method and the past n residues. This function can, for example be taken from the book "Pocketbook of Mathematics" by Bronstein, $25^{th}$ Edition 1991, page 680. Hence, according to the invention a failure is searched for only in the last n measurements. Hence, a sensor failure or system failure does not play any role in the current failure status if it occurred prior to the last n timed steps. Contrary thereto in the known methods in which the deviation states or residues of all past timed steps are taken into account, the sensor signals or the system model which are already again deviation free, could possible still be evaluated as failed so that the entire system is degraded.

Instead of the significance, the probability density of the latest n measurements can be used for ascertaining the failed status. The ascertaining of the probability density is described in the printed publication Bryson, A., Yu-Chi, H., "Applied Optical Control", 1975, pages 388 to 389. The ascertaining can be adapted to n measurements. Further, a confidence estimate of the system status over the last n measurements can be used to ascertain a failure status. The confidence estimate is a check whether the system state moves with a predetermined probability within predetermined limits. The methodology of the confidence estimate is described, for example in the "Pocketbook of Mathematics", Bronstein, $25^{th}$ Edition, 1991, pages 684 to 686. It is also conceivable that further failure recognition methods can be used such as, for example, a hypothesis test.

Thus, according to the invention a deviation measure number and preferably a probability magnitude or characteristic number is used for determining the failure status. Thereby, it is the essential criterium that the failure recognition is referenced to a predetermined interval of n measurements. This interval represents the time delay with which a failure is recognized. The predetermined number of measurements for ascertaining the failure status according to the invention may be variable or it may be adjustable in dependency, for example of an operational status of the sensor system or also of the application system or it may depend on the application case. An adjustment of the number n can also take place automatically. For example, in relatively critical operational states the number n may be selected to be relatively small compared to non-critical operational states.

According to the invention two limits or threshold values are defined for the evaluation of the failure status. With these limits or threshold values the failure status or failure state of the respective observer to which the failure status has been allocated, is evaluated, i.e. the main observer or the sub-observer of the first or further observers is evaluated. A first threshold value or diagnosis threshold value relates to whether in the respective observer a significant deviation can build up. A second threshold value or failure threshold value determines whether the respective observer is evaluated as failed.

In the illustration of the FIG. 3 failure states that are within, i.e. below the first threshold value are designated with "a". These failure states relate to observers or combinations that are free of failure and in which no deviation can build up slowly. Observers or combinations whose failure states lie within the area between the first and the second threshold value are designated with "b". Further, observers with a failure state which is above the two limits, are designated in FIG. 3 with "c" and are checkmarked with a cross. An observer with such a failure state is classified as failed. In this connection the buildup of a deviation designates the increasing of an initially small deviation over a plurality of timed steps.

According to the invention the sensor fusion works on the basis of a first combination of at least one sensor and one system model as long as the failure status lies there within the range designated with a or b. The first combination of at least one sensor and one observer is referred to in the following simply as combination. Thereby, this first combination may also be a combination of at least one sensor and one system model to which the reconfiguration method has already switched over from the main observer. Stated differently the first observer or the first combination must not be the main observer or the main combination or the combination with the main observer. The system states ascertained by the first combination are transmitted to the data processing unit 14, 24. Further, the observer bank or a further combination with a respective observer always returns to this first combination when this first combination reaches from another range to the range "a" or "b", that is the deviations of past states are smaller than the first or second threshold value. When the first combination or the respective active combination is within the "a" or "b" range the system state thereof is transmitted outwardly to the data processing unit 14, 24, that is the values calculated by the system state are transmitted. The first or also the second threshold value can be taken as a quality criterium of the ascertained sensor value or of the used sensors or system models. These values can also be interpreted as an accuracy limit which must satisfy the system status.

In the example shown in FIG. 3 the failure status of a first combination including at least one sensor and one observer, reaches the value b in the timed step k+1. Thus, the failure status lies between the first and the second limit, i.e. between the diagnosis threshold value and the failure threshold value. The sensor fusion system according to the invention interprets this occurrence as a possibility for the fact that a significant deviation could build up in the first combination or in the momentary main combination. At this point of time, i.e. following the exceeding of the diagnosis threshold value the observer bank is activated, that is, further available combinations of at least one sensor and at least one observer. This activation is accomplished in that a selection or all further combinations including at least one sensor and at least one observer, namely further observers or sub-observers are activated and initiated by the first combination. Initiation has reference to one and preferably to all system states and to the past residues n−1 which are significant for the determination of future failure states and which are used by the activated observers. At the point of time k+1 however, only one initialization and the activation is performed. However, now as before, the system status that has been ascertained by the main observer and not by a sub-observer, is transmitted to the data processing unit 14, 24.

An activation of a further combination and thus a deactivation of the first combination with a main or first observer takes place according to the invention only then when the failure status of the first observer exceeds the second threshold value. This takes place in FIG. 1 at the point of time k+10 at which the first combination has a failure status "c". At such an occurrence a further combination 32 including at least one sensor and at least one observer is activated, wherein the observer has at least one predetermined failure status at this point of time. Preferably, the predetermined failure status is the most advantageous of the still available combinations.

In case a total of only two combinations or only one further combination are available, only the activation of the second combination can take place. If the failure status of the second combination itself is above the second threshold value, the sensor system is classified as failed and a respective defect message is generated. In case that several further combinations are available after the first combination has exceeded the second threshold value, the selection of the combination to be activated can take place in accordance with a predetermined sequence or the selection can take place based on which combination at a predetermined point of time has the best failure status. This point of time can be the point of time when the second threshold value is exceeded by the respective first combination or it may be another point of time, for example, the conclusion of a predetermined time interval following this point of time.

In the example shown in FIG. 3 this is the observer or the sub-observer which uses the signals of the LINS and TRN. Thus, in this situation a GPS sensor failure has been recognized. In case no sub-observer had a failure status of "a" or "b" the highly unlikely case had occurred that all sensors GPS, LINS and TRN have failed and thus, the entire observer bank or all combinations of at least one sensor and one observer would be defective. Thus, a warning can be provided outwardly to the effect that the output of the observer bank has failed and thus the integrity of the output signal cannot be warranted.

Then, in the next timed step, the main observer is reinitiated by the LINS/TRN observer, more specifically, the present system status and the past n−1 residues or the probability indicators of the main observer are overwritten with the values of the sub-observer that works on the basis of LINS and TRN or by the residues which the LINS/TRN observer has received at its initialization. In this example then the ascertained failure status of the main observer has the value "a" and thus it is assumed that no deviation can build itself up in the main observer which exceeds the required or specified accuracy. Therefore, the observer bank is deactivated. If the main observer would have a failure status b, this would lead to a new activation of the observer bank in the step k+11. In this case the remaining sub-observers would be initiated in the step k+11 by the values of the LINS/TRN sub-observer. In case the main observer had a failure status "c" then, immediately after the activation of the observer bank, a switch-over to the best sub-observer with the failure status a or b would be performed. As in the timed step k+10 it also is true that in case no sub-observer has a failure status of "a" or "b", the highly unlikely case has occurred that all sensor GPS, LINS and TRN have failed and thus the entire observer bank would have failed. Thus, a warning could be provided externally, which warning indicates that the output of the observer bank has failed and thus the integrity of the output signal cannot be warranted.

Thus, with the method according to the invention it is achieved that even if temporary sensor failures or system model defects occur, correct sensor signals or system models prior to and after the sensor defect or system defect are not rejected. Correct sensor signals or system models prior to the internal failure are used because prior to the internal failure the operation is always based on the main filter. Since the observer bank switches over to the main observer as soon as the probability indicators or residues of the last "n" timed step result in a failure status "a" or "b", correct sensor signals and system models are used after the internal failure.

The past n−1 residues of the main observer that has been classified as failed, are overwritten with the residues of that sub-observer which, at the time has the best probability indicator. Therefore, the determination of the failure status always has reference to a predetermined number n of latest observer residues that have been considered to be correct.

It is essential to the method according to the invention that for ascertaining the failure status only an absolute deviation is used. The absolute deviation is based on a timed sequence of sensor values deviating from values that have been ascertained by means of at least one system model. Thereby, failures which are to be allocated to the sensoric, including hardware as well as software, and deviations which are to be allocated to the system model, become recognizable.

The method according to the invention can be applied to any observer based sensor system, whereby the sensors mentioned in the described example embodiment, that is LINS, GPS and TRN can be replaced by other sensors, sensor combinations, and system models. Examples for such areas of application have been shown in FIGS. 1 and 2.

What is claimed is:

1. A reconfiguration method for implementation in a computer system for compensating failures of a sensor system (1) with at least two observers, each observer being formed by at least one sensor (2, 50) for measuring (12, 22) system states of an application system (11, 21) and by at least one system model (4) for estimating of system states of the application system, in order to make system states with a predetermined reliability available to an allocated data processing unit (14, 24), said method comprising the following steps:
(a) ascertaining failure states based on time related deviation values for a first observer by comparing of a number of states measured by said at least one sensor, with a state estimated by said at least one system model,
(b) initiating at least one further observer in response to the reaching of a first threshold level of said deviations, said further observer having a number of past time steps for determining a failure status of the further observer, and
(c) transmitting the system states ascertained by the further observer to the data processing unit (14, 24) for further processing, as soon as the first observer has reached a second threshold value.

2. The reconfiguration method of claim 1, wherein, in response to the first observer exceeding the first threshold value, that further observer is selected which has the smallest deviations of the system states over a predetermined past time interval.

3. The reconfiguration method of claim 1, further comprising selecting a further observer in accordance with a predetermined sequence, when the first observer exceeds the first threshold value.

4. The reconfiguration method of claim 1, wherein the first combination is initiated by the further combination and sending system states for further processing to the data processing unit (14, 24) as soon as the first combination falls below the first threshold value.

5. The reconfiguration method of claim 1, comprising ascertaining the deviations by means of a confidence estimate.

6. The reconfiguration method of claim 5, comprising performing the confidence estimate by means of a Gauss-method or a quadrilateral method.

7. A sensor system for the determination of external states of an application system (11), said sensor system comprising an allocated data processing unit (14) for receiving said external states, at least two observers (6) with at least one respective sensor (2) and at least one respective system model representing the application system (11), said sensor system being adapted for performing functions in accordance with the method steps (a), (b) and (c) as defined in claim 1.

8. The sensor system of claim 7, wherein said application system is a vehicle.

9. The sensor system of claim 8, wherein a position or an attitude of the vehicle in space is used as an external state.

10. The sensor system of claim 7, wherein said sensor system is an air data system.

11. The sensor system of claim 7, wherein said data processing unit (14) is a monitor.

12. A sensor system for the determination of operational states of an application system (21), said sensor system comprising an allocated data processing unit (24) for receiving said operational states, and at least one set of observers (6) with at least one sensor (2) and a system model representing the application system (11), said sensor system being adapted for performing functions in accordance with the method steps of claim 1.

13. The sensor system of claim 12, wherein the application system is a control system and wherein the operational states are a position and/or a speed of a servo-valve or of an actuator.

14. The sensor system of claim 12, wherein the application system is a control system and wherein the operational states are pressures.

15. The sensor system of claim 12, wherein the application system is a chemical system and the operational states are a reaction temperature, a concentration of materials reacting with each other, or pressures.

16. The sensor system of claim 12, wherein the application system is an electrical system and the operational states are currents, voltages, capacities or material characteristics.

17. The sensor system of claim 12, wherein said data processing unit (24) is a monitor.

* * * * *